Patented Dec. 23, 1941

2,267,150

UNITED STATES PATENT OFFICE 2,267,150

METHOD AND MEANS FOR CONTROLLING CODLING MOTHS AND OTHER INSECTS IN THEIR LARVAL AND PUPAL STAGES

Charles B. Gnadinger, Edina, Minn.

No Drawing. Application August 12, 1939,
Serial No. 289,914

10 Claims. (Cl. 167—24)

This invention relates to a method and means for controlling insects in their larval and pupal or cocoon stages, and has thus far found its most valuable application in controlling the larval and pupal stages of the codling moth, *Carpocapsa pomonella L.* However, it is understood that the method can be used for the control of the larval and pupal stages of other plant-infesting insects. Insofar as I am aware, there never has been any commercially practicable and really effective lethal material for controlling the codling moth and other insects while in the cocoon or pupal stage, nor any means for causing a migration of the larvae of insects to a particular part of a plant whereat they can be killed in the cocoon, and without injury to the plant.

In a previous application for patent, Serial No. 283,181 for Method for controlling codling moths and other insects, I have described the life history of the codling moth, pointing out that the overwintering form is the larva or worm, and that in the spring this worm changes to the pupal state, from which the adult moth emerges.

In the autumn the overwintering larvae burrow under the bark or into pruning scars, or into the ground and especially into the soil near the base of the tree. They also burrow under loose bark or under trash near the base of the tree. The larvae there spin silken cocoons in which they pass the winter. With the coming of warm weather in the spring, the worms undergo a marked change in appearance and enter the pupal state, still within the cocoon. In the same manner, the mature larvae of the first brood leave the apples. This usually occurs in late June or July, and these larvae burrow under rough bark, spin cocoons, pupate and emerge as second brood moths. In some localities, in addition to overwintering larvae, there are three distinct broods of larvae. A high proportion of the second brood larvae and many of the third brood larvae constitute the overwintering larvae for the succeeding year. The number of broods varies with the climate and the length of the growing season.

My invention relates to a commercially feasible method and means for controlling the larvae and pupae by causing the larvae to seek certain portions of the bark of the tree, which are more accessible for the quick and easy application of some lethal substance, and without injury to the foliage, fruit, leaf buds, fruit buds or new growth of the tree. Among features of the invention are: The method of getting the larvae to pupate in a certain place on the tree or plant, and keeping the larvae from going into the ground, and the use of a pyrethrin-kerosene solution for killing the contents of the cocoons.

One of the objects of the process is to so operate as to cause the larvae to leave the foliage part of the plant or tree, to seek the bark of those portions of the tree which are sufficiently remote from the foliage, fruit, leaf buds, etc., to allow the application of a lethal substance in a manner not to contact said fruit, leaf buds, etc., and so that the same will not be destroyed during the process of destroying the larvae and pupae. A discovery which is a feature of the invention relates broadly to the use of pyrethrins in a suitable fluid vehicle, and more specifically to the use of pyrethrins in kerosene for killing the codling moth in the pupating stage.

Heretofore there has existed no satisfactory commercial method for adequately controlling the cocoon stage of the codling moth, by killing the larvae or pupae in their cocoons. Neither aqueous sprays, nor even fumigants, penetrate to the larvae or pupae within the cocoons. Heretofore approved methods of orchard sanitation have included the scraping of the rough bark from the trees; the use of chemically treated bands placed around the trunk and in which the larvae spin their cocoons and are killed by the chemical with which the band is impregnated; and the use of bands of sticky material in which the larvae are trapped.

However, it unfortunately happens that scraping the rough bark or scraping the hibernating places tends to drive the larvae into the ground in search of other suitable hibernating places. This lengthens the period of spring emergence of adult moths because the ground temperatures are lower than the tree temperatures. This, in turn, complicates the control program in that it requires more extensive (and expensive) use of insecticides. Chemically treated bands are only partially effective because many of the larvae do not enter the bands or attempt to cross them, but spin down on webs either to an unbanded part of the tree or to the ground, and thence crawl to the trunk of the tree. In the fall many of the worms drop to the ground in the apples. Adhesive bands have the same limitations and objections as chemically treated bands.

Various materials have been tried heretofore for treating the cocoons to kill their contents. For example, kerosene has been used, but alone has little or no effect upon larvae or pupae spun up in cocoons. However, I have discovered that kerosene containing a small amount of pyrethrin or small amounts of pyrethrins is very toxic to both larvae and pupae in cocoons.

While I claim the use specifically of pyrethrins in kerosene as a means for killing the contents of the cocoons, I believe also that part of the efficiency of my method consists in only partially debarking the trees to cause the pupae to seek bark on the lower portions of the trees, in which position they are more accessible for the application of the proper insecticide, and at which location a lethal insecticide can be applied in strength sufficient to kill, without injuring any and pupae found under the bark were made after thirty-six hours after treatment. The kill of larvae was 99% and the kill of pupae was 97%.

I also apply this treatment to the tree after the first brood worms have left the apples and spun their cocoons under the bark, either in the larval state or pupal state. In certain sections, this occurs usually in late June or July. The application of the present invention greatly reduces the second brood of moths, as shown by will it kill larvae and pupae under the bark, because the mist will not penetrate the crevices of the bark to wet the cocoons. I therefore believe myself the first to discover that pyrethrins in solution are effective for the purpose herein.

I am familiar with the use of pyrethrum-oil sprays, emulsified in water, as used in an attempt at control of the codling moth and other pests, but it is to be noted that those sprays are entirely different from the spray of my invention, and such sprays do not kill codling moth larvae and pupae in cocoons or under the bark of trees, because these aqueous sprays will not penetrate. The old, ineffective sprays were mineral oils in which pyrethrins were dissolved, and these oil-pyrethrin solutions were emulsified in water, so that the finish spray contained only 1% to 6% of oil. My spray contains about 99% of oil.

The mature larvae leave the apples in the fall and crawl to a hibernating place under the bark of the tree where they spin a cocoon. They remain in this cocoon in the larval stage during the winter. About April (in some localities) these larvae transform to the pupal stage and finally emerge as adult moths. The stage to which applicant is referring is the over-wintering larval stage or the mature larval stage.

Of course, my dormant spray may be put on the trees in the winter time, when there is little or no foliage. The danger of injury is not only to the foliage but also to the foliage buds, if the trees are dormant, and to the fruit (in the fall), or to the fruit buds, if the tree is dormant. Therefore, there is danger of injury to the foliage buds or fruit or fruit buds, depending on the time of application.

In my experiments which led to the discoveries herein, I sprayed exposed codling moth larvae with pyrethrin-oil emulsion containing 3% of oil, applying the spray with a pressure of 400 pounds per square inch and obtaining only a kill of less than 45%. It is noted that these larvae were not in cocoons and yet they were not killed by the spray. Had they been in cocoons and protected by the bark of the tree, it is believed the kill would have been very much lower, or that there would have been no kill at all. The oil used was a dormant type of oil and contained 200 milligrams of pyrethrins per 100 cc. A similar spray containing no pyrethrins, gave only 16% kill under the same conditions. A pyrethrin-oil solution emulsified in water with soap and applied to Red Delicious apple trees, heavily infested with codling moth, did not reach larvae and pupae under the bark even when applied at a pressure of 700 pounds per square inch.

I prefer to use kerosene because it is a light, highly refined oil and therefore less likely to injure the tree. However, I can use stove oil or fuel oil or any type of mineral oil that flows readily and does not injure the tree. Therefore, although I specify the kerosene-pyrethrin combination as a solution, I do not believe that the invention should be entirely limited to that material, because in addition to or independently of the character of the lethal material, I have discovered a way to get the larvae and pupae away from the tender parts of the tree and to an intermediate location between said parts and the ground and in a pupating position whereat the spray or other insecticidal material can be applied in a manner to get the maximum kill in the cocoon state, and without injury to the tree or plant.

I prefer also the use of pyrethrin or pyrethrins because these substances are very effective against codling moth larvae or pupae, but it is understood that in conjunction with my method for getting the cocoons in the most accessible position, other insecticidal material which will kill codling moth larvae and pupae can be used, if such substances do not injure the tree.

I have found that pyrethrin concentrations of 40 to 100 milligrams per 100 cc. of kerosene are effective, and although I claim substances within these ranges specifically and for use for killing insects in the cocoon stage, I believe my invention is broader than the particular ranges or concentrations. I have found that overwintering larvae and their pupae are no more difficult to kill than larvae or pupae which have spun up in cocoons for only a week or two, that is, the larvae or pupae of the first brood.

The present method and means can be used in conjunction with the method for controlling codling moths and other insects disclosed in my application Serial No. 283,181. To my knowledge, I am the first to conceive of a method, irrespective of the material used for killing, in which the pupae are caused to migrate to the lower, more accessible reaches of the tree, but are so controlled as not to be likely to enter the ground and also controlled so as to go into the cocoon state at a position which is most advantageous for the application of the lethal substance, without injury to the tree.

I claim as my invention:

1. A process for controlling codling moth in the larval and pupal or cocoon stages which consists, in scraping the rough bark from the upper branches of an infested tree, leaving about 2 to 8 feet of the trunk and leaders nearest the ground unscraped, whereby to force the larvae to spin their cocoons and pupate in the bark of the unscraped portion of the tree, then applying to said unscraped portion and to the ground near the trunk and to trash and weeds under the tree a kerosene-pyrethrin spray, which is too toxic to be used on foliage, fruit, leaf buds.

2. A commercial process for controlling codling moth on orchard trees in their mature larval and cocoon stages which consists, in so scraping the bark of the infested plant as to cause the larvae to seek bark regions of the plant remote from the foliage or foliage buds or fruit or fruit buds in which to spin their cocoons, and then after the larvae have moved to those regions and are in the cocoon stage, applying a pyrethrin-kerosene spray.

3. A process for controlling tree-infesting insects in the larval and pupal or cocoon stages which consists, in so scraping the bark of the infested tree as to cause the larvae to migrate to the bark of the lower parts of the leaders and of the trunk, and then after the larvae have moved to said regions and are in the cocoon stage, applying to said regions a pyrethrin-kerosene insecticide, containing approximately 99% of kerosene.

4. A process for controlling tree-infesting insects in the larval and pupal or cocoon stages which consists, in so scraping the bark as to cause the larvae to migrate to the bark of a predetermined region of the tree, and then after the larvae have moved to those regions and are in the cocoon stage, applying to said region a pyrethrin-kerosene insecticide containing approximately 99% of kerosene.

5. A process for controlling codling moth in the cocoon stage on orchard trees which consists, in scraping the bark of the foliage-bearing branches of the infested tree in a manner to cause the larvae to migrate to regions of the bark of the tree sufficiently remote from the foliage-bearing regions as will allow use of insecticide on the bark without application or injury to the foliage or fruit or buds, and then after the larvae are in the cocoon state in the bark of said regions, applying to said regions a pyrethrin-kerosene mixture.

6. A process for controlling codling moth in the cocoon stage on orchard trees which consists, in scraping the bark of the foliage-bearing branches of the infested tree in a manner to cause the larvae to migrate to regions of the bark of the tree sufficiently remote from the foliage-bearing regions as will allow use of insecticide on the bark without injury to the foliage or fruit or buds, and then after the larvae are in the cocoon state in the bark of said regions, applying to said regions a pyrethrin-kerosene mixture in the form of a spray under pressure of not substantially less than twenty pounds per square inch.

7. A process for controlling codling moth in the cocoon stage on orchard trees which consists, in scraping the bark of the foliage-bearing branches of the infested tree in a manner to cause the larvae to migrate to regions of the bark of the tree sufficiently remote from the foliage-bearing region as will allow use of insecticide on the bark without application or injury to the foliage or fruit or buds, and then after the larvae are in the cocoon state in the bark of said regions, applying to said regions a pyrethrin-kerosene mixture in which the pyrethrin concentration ranges from 40 to 100 milligrams of pyrethrins to each 100 cc. of kerosene.

8. A process for controlling codling moth in the cocoon stage on or in the bark of the tree which consists, in scraping the limbs of the tree with the exception of the trunk and those portions of the leaders near the trunk to cause the larvae to seek those unscraped areas, and then when the insect is in the cocoon state in those areas, applying to the bark a solution of pyrethrins in mineral oil.

9. A process for controlling codling moth on trees and in their cocoon stage which consists, in scraping the bark in a manner to cause the larvae to migrate to and concentrate in the bark of the lower parts of the leaders and in the trunk to spin their cocoons, and then after the larvae have so migrated and are in cocoon stage, applying to the bark of said regions a pyrethrin-mineral oil insecticide in the form of coarse spray.

10. A process for controlling codling moth and other insects on orchard trees while in the larval and cocoon states, which comprises, scraping the tree in such a manner that the larvae in seeking a place to pupate will migrate to and concentrate in the bark of the trunk and in those portions of the leaders which are near the trunk, and then after such migration applying a kerosene-pyrethrin spray to the bark to those regions to kill mature larvae and the contents of the cocoons.

CHARLES B. GNADINGER.